(12) United States Patent　　　　(10) Patent No.: US 12,678,988 B2

Giurlani et al.　　　　　　　　　　　(45) Date of Patent: Jul. 14, 2026

(54) CUTTING MACHINE FOR TRANSVERSELY CUTTING LOGS OF PAPER MATERIAL

(71) Applicant: FUTURA S.P.A., Capannori (IT)

(72) Inventors: Giovacchino Giurlani, Capannori (IT); Ciro Guarini, Pisa (IT)

(73) Assignee: FUTURA S.P.A., Capannori (IT)

( * ) Notice: Subject to any disclaimer, the term of this patent is extended or adjusted under 35 U.S.C. 154(b) by 220 days.

(21) Appl. No.: 17/769,889

(22) PCT Filed: Nov. 11, 2020

(86) PCT No.: PCT/IT2020/050274

§ 371 (c)(1),
(2) Date: Apr. 18, 2022

(87) PCT Pub. No.: WO2021/106019

PCT Pub. Date: Jun. 3, 2021

(65) Prior Publication Data

US 2022/0297334 A1　　Sep. 22, 2022

(30) Foreign Application Priority Data

Nov. 25, 2019　　(IT) ........................ 102019000022035

(51) Int. Cl.
　　B26D 7/26　　　　(2006.01)
　　B23D 35/00　　　(2006.01)
　　　　　　(Continued)

(52) U.S. Cl.
　　CPC ......... B26D 7/2621 (2013.01); B23D 35/008 (2013.01); B23Q 3/15706 (2013.01);
　　　　　　(Continued)

(58) Field of Classification Search
　　CPC ............ B23Q 3/15713; B23Q 3/15722; B23Q 3/15706; B23Q 3/15513; B23Q 3/15539;
　　　　　　(Continued)

(56) References Cited

U.S. PATENT DOCUMENTS 4,780,951 A * 11/1988 Beyer ................... B23Q 11/08
　　　　　　　　　　　　　　　　483/33
4,907,337 A * 3/1990 Krusi ................... B23Q 7/1436
　　　　　　　　　　　　　　　　408/56
(Continued)

FOREIGN PATENT DOCUMENTS

DE　　3234675 A1 * 9/1982 ......... B23Q 3/15526
DE　　3246168 A1 * 7/1983 .......... B24B 45/003
(Continued)

OTHER PUBLICATIONS

DE3326292C1 English Translation Binninger Wolfgang; Jan. 31, 1985.*

(Continued)

*Primary Examiner* — Laura M Lee

(74) *Attorney, Agent, or Firm* — Maier & Maier, PLLC

(57)　　　　ABSTRACT

A machine for transversely cutting logs of paper material including a cutting station in which is arranged a cutting unit including an arm rotating about a horizontal axis and on which it can mounted a blade adapted to perform the transverse cutting of one or more logs of paper material introduced in the machine and placed in the cutting station, where is arranged a loading station in which a support is provided for supporting a further blade intended to replace the blade mounted on said arm, and in which said support is connected to a mobile unit allowing it to be moved between said stations. The support is always provided with a blade-holder hub with a respective pin. The blade-holder hub is removably connected to the support.

10 Claims, 19 Drawing Sheets

(51) Int. Cl.

| | |
|---|---|
| *B23Q 3/157* | (2006.01) |
| *B26D 1/16* | (2006.01) |
| *B26D 3/16* | (2006.01) |

(52) U.S. Cl.
CPC ........... *B23Q 3/15713* (2013.01); *B26D 1/16* (2013.01); *B26D 3/16* (2013.01); *B26D 2210/11* (2013.01)

(58) Field of Classification Search
CPC .............. B23Q 3/1554; B23Q 3/15773; B23Q 2003/155418; B23Q 2003/155411; B23Q 2003/155428; Y10T 83/303; B26D 3/16; B26D 2210/11; B23D 35/008
USPC ................. 83/174, 329, 481; 483/33, 56, 30
See application file for complete search history.

(56) References Cited

U.S. PATENT DOCUMENTS

| | | | | |
|---|---|---|---|---|
| 5,522,292 | A | 6/1996 | Biagiotti | |
| 5,997,454 | A * | 12/1999 | Naldi | B27B 5/30 |
| | | | | 483/68 |
| 6,030,326 | A * | 2/2000 | Azuma | B23Q 3/15722 |
| | | | | 483/30 |
| 6,786,808 | B1 | 9/2004 | Biagiotti | |
| 7,988,531 | B2 * | 8/2011 | Braun | B23Q 7/047 |
| | | | | 451/247 |
| 8,231,434 | B2 * | 7/2012 | Altmann | B24B 45/003 |
| | | | | 451/195 |
| 8,376,921 | B2 * | 2/2013 | Wember | B23Q 1/625 |
| | | | | 483/18 |
| 9,566,684 | B2 * | 2/2017 | Braun | B24B 5/02 |
| 10,576,562 | B1 * | 3/2020 | Nishijima | B27B 5/34 |
| 2002/0173413 | A1 * | 11/2002 | Pallmann | B27L 11/02 |
| | | | | 483/30 |
| 2022/0297334 | A1 * | 9/2022 | Giurlani | B26D 7/2621 |

FOREIGN PATENT DOCUMENTS

| | | | | |
|---|---|---|---|---|
| DE | 3326292 | C1 * | 1/1985 | ............ B23D 47/00 |
| DE | 9113684 | U1 * | 12/1991 | ........ B23Q 3/15713 |
| DE | 9413771 | U1 * | 8/1994 | .......... B23D 35/008 |
| EP | 3186042 | B1 | 3/2019 | |
| FR | 2823142 | A1 * | 10/2002 | .......... B23Q 3/1554 |
| GB | 1262012 | A * | 2/1972 | ............ B23D 35/08 |
| JP | 59201714 | A * | 11/1984 | .......... B23D 35/008 |
| JP | 11197982 | A * | 7/1999 | .............. B23Q 7/04 |
| JP | 11340169 | A * | 12/1999 | |
| JP | 2001113492 | A * | 4/2001 | .............. B26D 1/16 |
| WO | 01/72484 | A1 | 10/2001 | |
| WO | 2016/030125 | A1 | 3/2016 | |

OTHER PUBLICATIONS

JP-59201714A English Translation; Hidaka, Katsushi; Nov. 15, 1984.*

DE-9113684-U1 English translation; Dec. 19, 1991; Keuro Maschinebau ; B23Q3/15713.*

JP-2001113492-A English Translation; Apr. 24, 2001; Yamaguchi Chotaro ; B26D1/16.*

International Search Report and Written Opinion of the International Searching Authority issued on Mar. 3, 2021 in corresponding International application No. PCT/IT2020/050274; 8 pages.

* cited by examiner

CUTTING MACHINE FOR TRANSVERSELY CUTTING LOGS OF PAPER MATERIAL

FIELD

The present invention relates to a machine for the transversal cutting of logs made of paper material.

BACKGROUND

It is known that the production of logs made of paper material generally involves the winding of a predetermined amount of a paper web around a winding axis or a tubular core. The paper web can consist of a single ply or multiple overlapping plies of paper and unwinds from one or more parent reels to be embossed, if necessary, or undergo further processing steps, before the final winding that takes place in a rewinder. The logs produced by the rewinder are then cut transversely using cutting-off machine to obtain rolls of shorter length than the logs which corresponds to the height of the plies unwound from the parent reels. Examples of cutting-off machines are provided in U.S. Pat. Nos. 6,786, 808, 5,522,292 and EP3186042B1. In general, the cutting-off machines for the transversal cutting of the logs of paper material comprise a plurality of longitudinal channels, in each of which a log is placed, and a cutting head. By coordinating the action of the cutting head with a mechanism for advancing the logs in the respective channels, each log is divided into a plurality of rolls of the desired length. The cutting head generally comprises a circular blade which rotates around its own axis with a predetermined angular speed and is carried by an arm which, in turn, rotates around an axis parallel to the axis of the blade and is spaced from the latter by a predetermined value. The blade is subject to wear and is periodically sharpened, which leads to a progressive reduction of its diameter. When the diameter of the blade reaches the minimum value of use, it is necessary to replace it with a new blade.

Replacing worn blades is a very risky task for the operators, due both to the presence of the sharp cutting edge of the blades and the weight and size of the blades. The main purpose of the present invention is to propose a cutting-off machine for the transversal cutting of logs in which the replacement of worn blades is carried out by means of an automated procedure which allows to minimize the intervention of the operators and, at the same time, the time required for this operation.

SUMMARY

This result has been achieved, in accordance with the present invention, by providing a machine having the characteristics disclosed herein.

A machine in accordance with the present invention allows worn blades to be replaced by means of an automated blade replacement mechanism which is particularly efficient both in terms of reliability and safety for the operators, and ensures replacement times compatible with the current production requirements.

BRIEF DESCRIPTION OF THE DRAWINGS

These and further advantages and characteristics of the present invention will be better understood by every person skilled in the art thanks to the following description and the attached drawings, provided by way of example but not to be considered in a limiting sense, in which.

DETAILED DESCRIPTION OF THE EMBODIMENTS

Figures 1A, 1B:
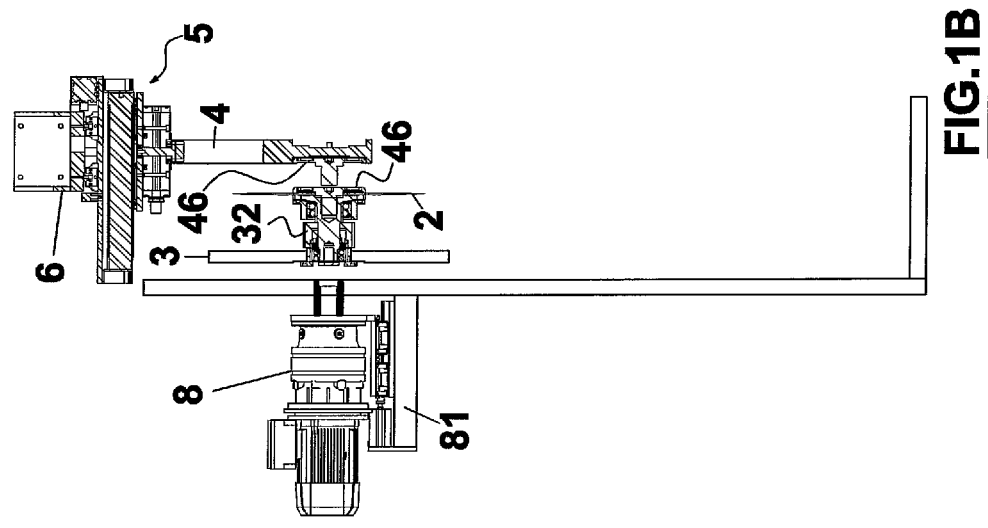
FIG. 1A represents schematic front views of a machine according to the present invention in a succession of operating steps concerning the replacement of a worn blade with a new blade.
FIG. 1B represents, in the same order, schematic side views of the machine of FIG. 1A.

Reduced to its essential structure and with reference to the annexed drawings, a cutting-off machine (M) for the transversal cutting of the logs of paper material in accordance with the present invention comprises a plurality of channels (1) which define corresponding paths for advancing the logs (L), and a cutting head (CT) arranged to perform the transversal cutting of the logs (L) in order to obtain paper rolls having a predetermined length. The cutting head (CT) is mounted in a cutting station (T) of the cutting-off machine (M) and comprises a circular blade (2) that is oriented transversely to the channels (1) of the machine (M) and is driven by a corresponding electric motor which controls its rotation with a predetermined angular speed around its own rotation axis (x). The blade (2) is mounted on an arm (3) which, in turn, rotates with a predetermined speed around an axis (j) parallel to the axis (x) of the blade (2) by means of another electric motor. The logs (L) in the channels (1) of the machine (M) can be moved simultaneously towards the cutting head (CT) in order to transversely cut a plurality of logs at the same time by means of the blade (2). The system for advancing the logs (L) in the channels (1) can be of any type known to those skilled in the art. For example, the logs (L) are moved intermittently and at each stop the blade performs the transverse cut. The machine (M) can be equipped with elements for holding the logs, commonly called "pressers" (E), which hold the logs on the channels (1) during the execution of the cuts and release them immediately afterwards. The steps of handling, holding and transversal cutting of the logs, as well as the operation of the blade (2) and the arm (3), are known to those skilled in the art and therefore will not be described in further detail. According to a construction scheme known per se, for example, the logs (L) can be moved along said channels (1) by means of pushers acting on the back of the logs (not shown in the drawings). A blade sharpening mechanism (2), known per se, can be associated with the cutting head (CT). The machine (M) is equipped with an automatic device for replacing worn blades.

In accordance with the embodiment shown in the drawings, the blade (2) is constrained to the arm (3) by means of a joint (32) which has a rear side (320) constrained to the arm (3) and an opposite front side in which a threaded axial hole (321) is formed. The joint (32) is orthogonal to the arm (3) such that the blade (2) is spaced from the arm (3) when it is mounted on the latter. The pin (461) of a blade holder hub (46), further described below, is screwed in the threaded hole (321) formed on the front side of the joint (32), the blade holder hub being intended to constrain the blade (2) to the joint (32). A central part (322) of the joint (32) is connected to an electric motor carried by the arm (3) by means of a transmission belt (323). In practice, the blade (2) is constrained to the front part of the joint (32) by screwing the pin (461) in the threaded hole (322). The blade, in a per se known manner, has a central hole which allows the pin (461) to be positioned through the same central hole. The axis of rotation of the blade (2) coincides with the longitudinal axis of the joint (32).

In accordance with the present invention, the automatic device for replacing worn blades comprises a loading station (LS) in which a new blade (20) is arranged to replace a worn blade (2) mounted on the cutting head (CT) when the diameter of the worn blade reaches a minimum value that is deemed insufficient for the continuation of its use. The loading station (LS) is at a predetermined distance from the cutting head (CT). In the loading station (LS) there is a support (4) adapted to support, one at a time, both the new blade (20) and the worn blade (2) to be replaced. Said support (4) is mounted on a carriage (5) movable along a guide (6) which extends between the loading station (LS) and the cutting station (T). The support (4) consists of a metal plate, i.e. an element with a prevailing vertical development, and is rotatably constrained to the carriage (5), so that it can rotate on itself by 180°, as further described below.

Figures 17, 18:
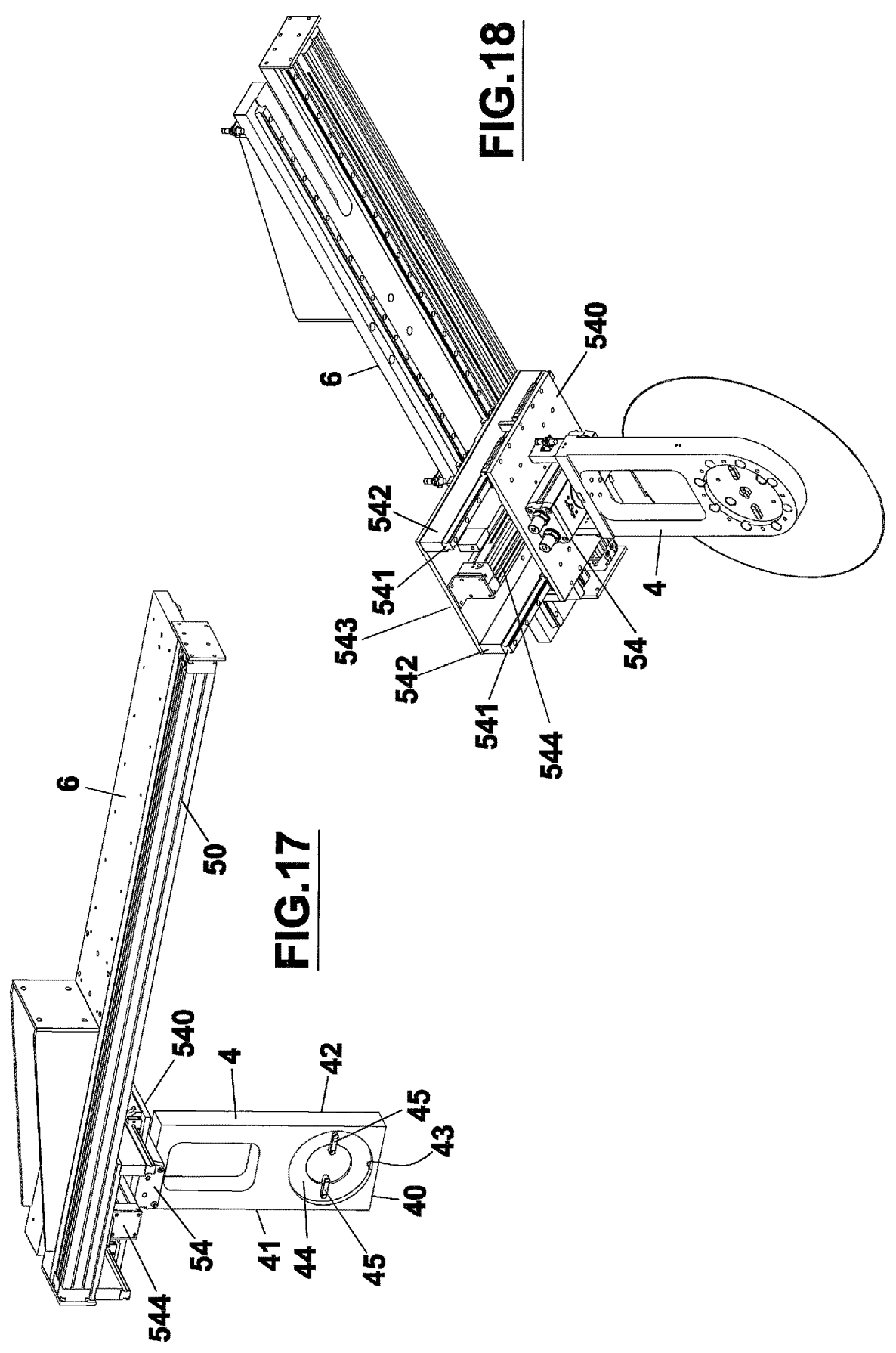
FIG. 17 represents a schematic perspective view of the support (4) and the carriage (5)
FIG. 18 represents a further perspective view of the support (4) and of the carriage (5)
Figures 19, 20:
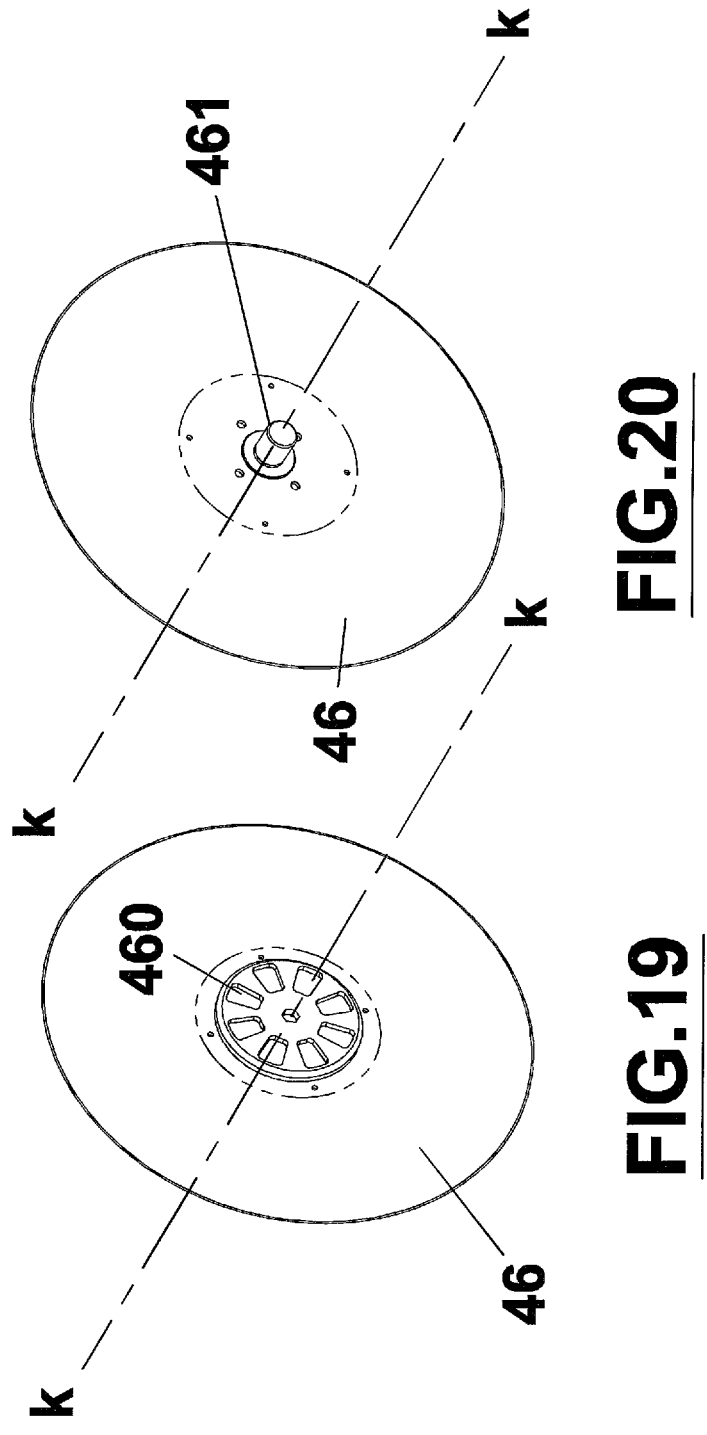
FIG. 19 and FIG. 20 are two perspective views of a hub (46)

With reference to the example shown in FIG. 17 and FIG. 18, the support (4) has, on its lower part (40), on both its faces (41, 42), a recess (43) in which a magnet (44) is positioned. For example, the recess (43) and the magnet (44) have the shape of circular crowns coaxial to each other. Two positioning keys (45) are arranged on the recess (43) for facilitating the positioning of a metal blade-holder hub (46). The latter, as shown in FIG. 20, on a respective rear face has a series of positioning slots (460) arranged circumferentially around its own axis (k) and, on the opposite front face, has a threaded pin (461) having a predefined length. The hub (46) magnetically hooks onto the magnet (44)) and its positioning on the support (4) is facilitated by the presence of the keys (45) of the support (4) and the slots (460) formed in the rear face of the hub (46). In assembled condition, the hub (46) has the pin (461) facing outwards perpendicular to the support (4).

As previously mentioned, the support (4) is mounted on a carriage (5) constrained to a guide (6) extending between the cutting station (T) and the loading station (LS), so that the support (4) can be moved bi-directionally between said stations (T, LS) along a path defined by the guide (6). For this purpose, the carriage (5) is connected to an actuator (50) which controls its movement along the guide (6). The support (4) is constrained to the carriage (5) by means of a rotary actuator (54) which allows the support (4) to be rotated around a vertical axis (z). Preferably, said vertical axis (z) is a central axis of symmetry of the support (4). In turn, the rotary actuator (54) is integral with a horizontal plate (540) mounted sliding on two guides (541) formed on the lower edges of two corresponding side walls (542) of the carriage (5). The latter has an upper surface (543) which joins the upper edges of said side walls (542) forming a compartment in which a linear actuator (544) is housed. The mantle of the linear actuator (544) is fixed to the lower face of the upper surface of the carriage (5), while the stem is connected to the horizontal plate (540). The lower edges of the side walls of the carriage, as the guides (541) and the linear actuator (544), are oriented orthogonally to the guide (6) on which the carriage (5) is mounted. Therefore, the support (4) can be moved both along the guide (6), both orthogonally to the guide (6), and in rotation around the vertical axis (z). In the drawings, the double arrow "M1" indicates the movement of the carriage (5) along the guide (6), the double arrow "M2" indicates the movement of the support (4) perpendicular to the guide (6), and the double arrow "M3" indicates the rotation of the support (4) around the vertical axis (z).

Advantageously, the machine (M) is provided with a device for blunting the blade (2). For example, said device comprises a pneumatic actuator (7) on whose stem is mounted a pad (70) which, when brought into contact with the cutting edge of the blade (2) in use, blunt it, thus preventing the operator responsible for managing the blade change from injures when manipulating it. For example, the pad (70) can be made of the same material of which the grinding wheels are normally made. The actuator (7) can be arranged as shown in the drawings, in such a way as not to interfere with the blade (2) during normal machine operation (M). For this purpose, the actuator (7) is arranged in a position suitably spaced from the cutting unit (CT) so that the pad (70) is brought into contact with the blade (2) only when the actuator (7) extracts its stem and moves the pad (70) towards the cutting edge of the blade (2). The blunt is determined by the contact of the pad (70) with the cutting edge of the blade (2) while the latter is being rotated.

In the cutting station (T), on the back of the arm (3), a gearmotor (8) is installed, equipped with a bush (80) with a horizontal axis which is coaxial to the joint (32) when the arm (3) is positioned in the blade replacement configuration as further described below. The gearmotor (8) is mounted on a slide (81) to be moved to and from the joint (32) by means of a respective actuator (82).

The device described above works as described below.

Figures 2A, 2B:
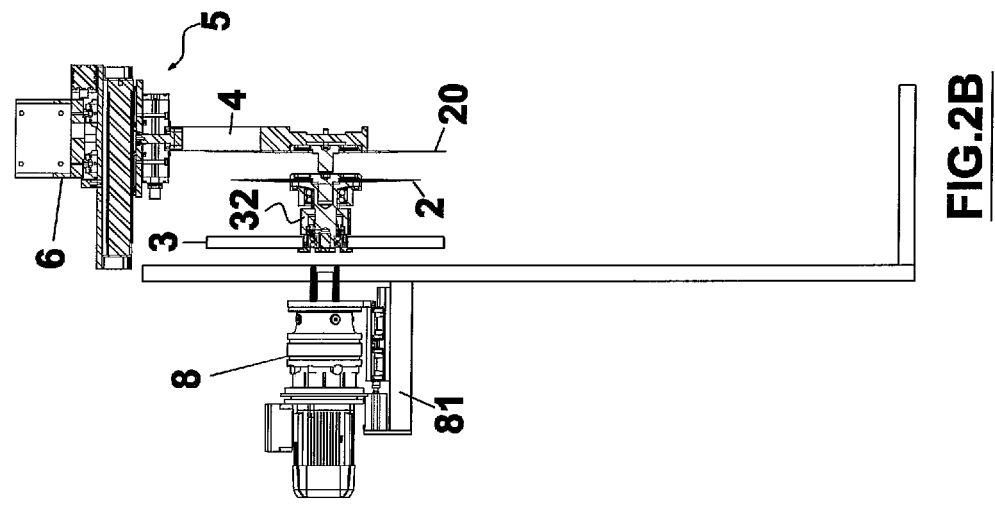
FIG. 2A represents schematic front views of a machine according to the present invention in a succession of operating steps concerning the replacement of a worn blade with a new blade.
FIG. 2B represents, in the same order, schematic side views of the machine of FIG. 2A.
Figure 3B:
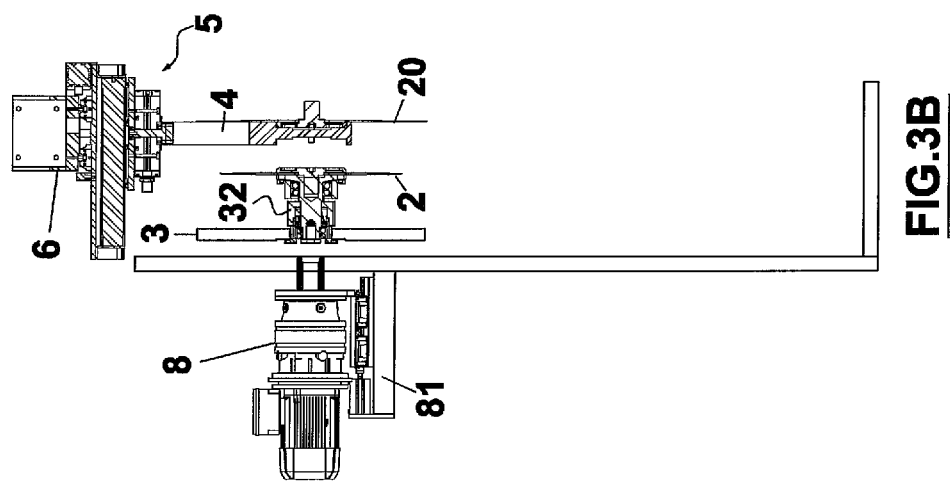
FIG. 3B represents, in the same order, schematic side views of the machine of FIG. 3A.
Figure 3A:
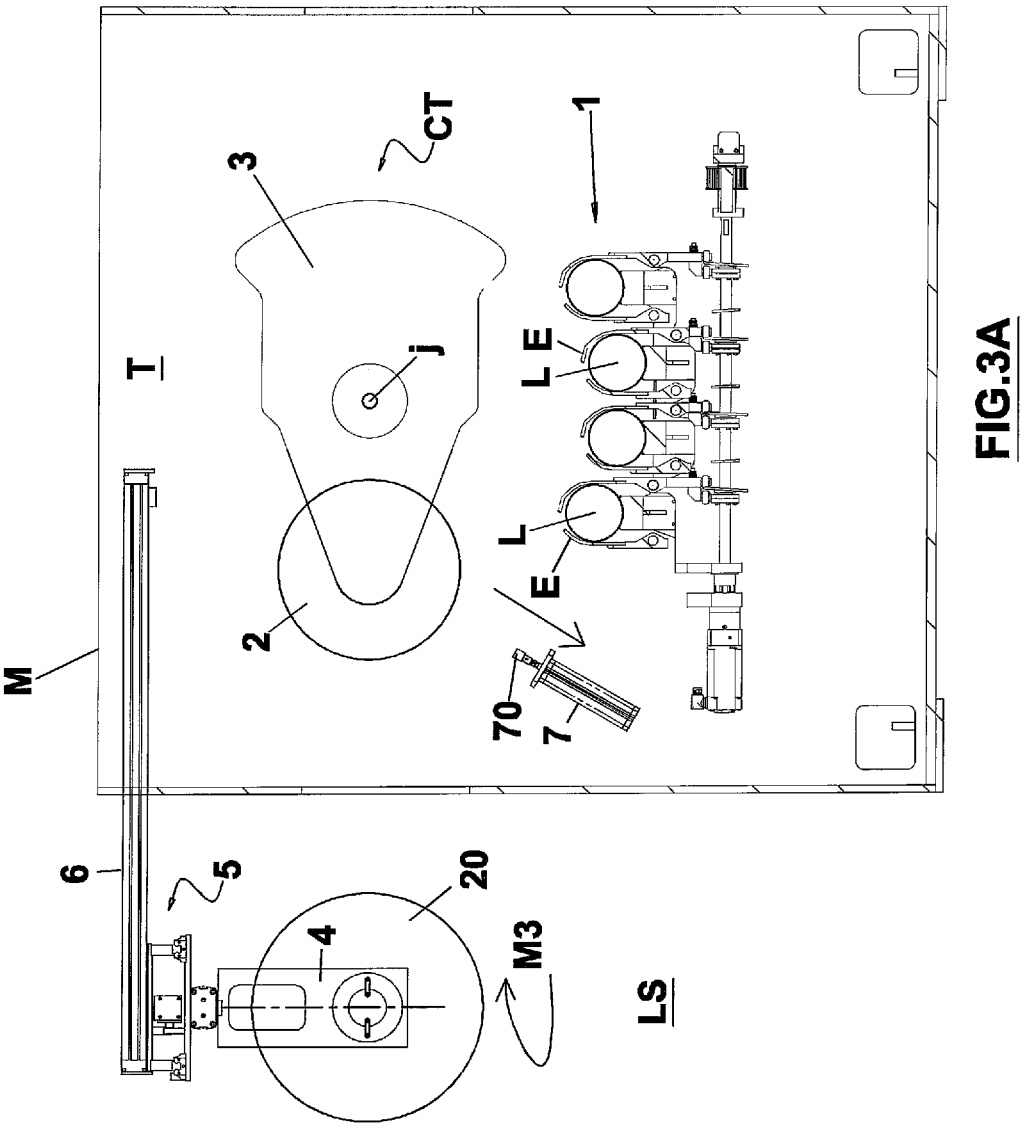
FIG. 3A represents schematic front views of a machine according to the present invention in a succession of operating steps concerning the replacement of a worn blade with a new blade.

In the configuration of FIG. 1A and FIG. 1B, the support (4) is waiting to receive a new blade intended to replace the blade (2) in use. In FIG. 2A and FIG. 2B an operator (not shown) in the station (LS) has inserted a new blade (20) on the hub (46) applied on the support (4). The blade (2) in use has reached the minimum diameter considered sufficient for its operational use and the arm (3) of the cutting unit (CT) has been positioned horizontally, so that the worn blade (2) is with its axis at the same height as the axis of the new blade (20), i.e. at the same height as the pin (461) of the hub (46) placed on the support (4). Furthermore, as schematically indicated by the arrow "W", the blunting device (6, 60) is activated for blunting the cutting edge of the blade (2) while the latter rotates. Subsequently, the operator exits the station (LS) and the support (4) is rotated by 180° as schematically indicated by the arrow "M3" in FIG. 3A. In this way, as shown in FIG. 3B, the support (4) has the free recess (43) (the other recess 43 is engaged by the hub 46 on which the

Figures 4A, 4B:
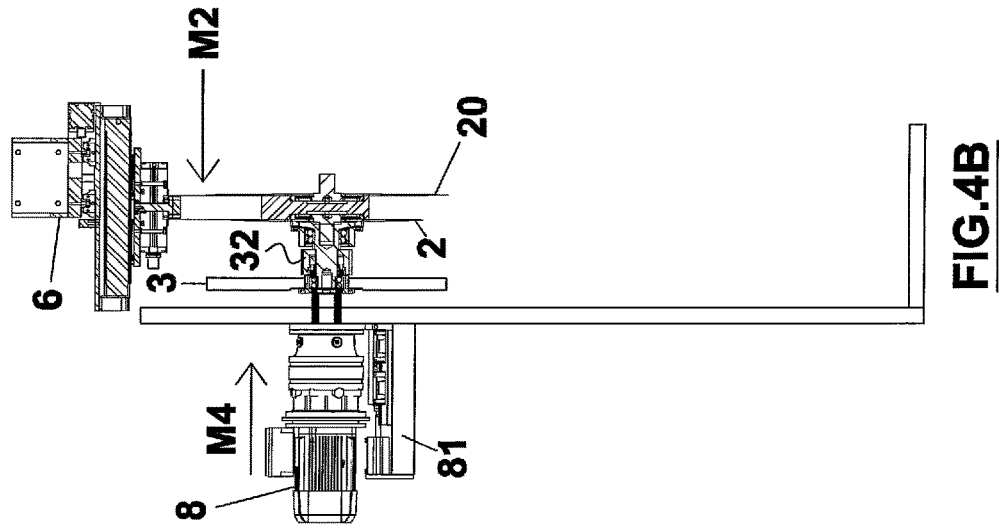
FIG. 4A represents schematic front views of a machine according to the present invention in a succession of operating steps concerning the replacement of a worn blade with a new blade.
FIG. 4B represents, in the same order, schematic side views of the machine of FIG. 4A.
Figures 5A, 5B:
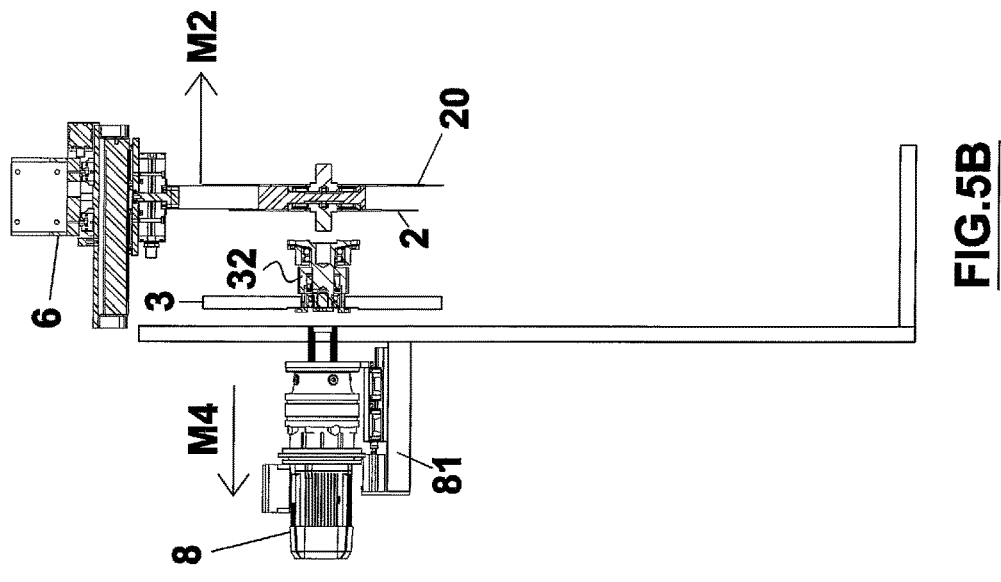
FIG. 5A represents schematic front views of a machine according to the present invention in a succession of operating steps concerning the replacement of a worn blade with a new blade.
FIG. 5B represents, in the same order, schematic side views of the machine of FIG. 5A.
Figures 6A, 6B:
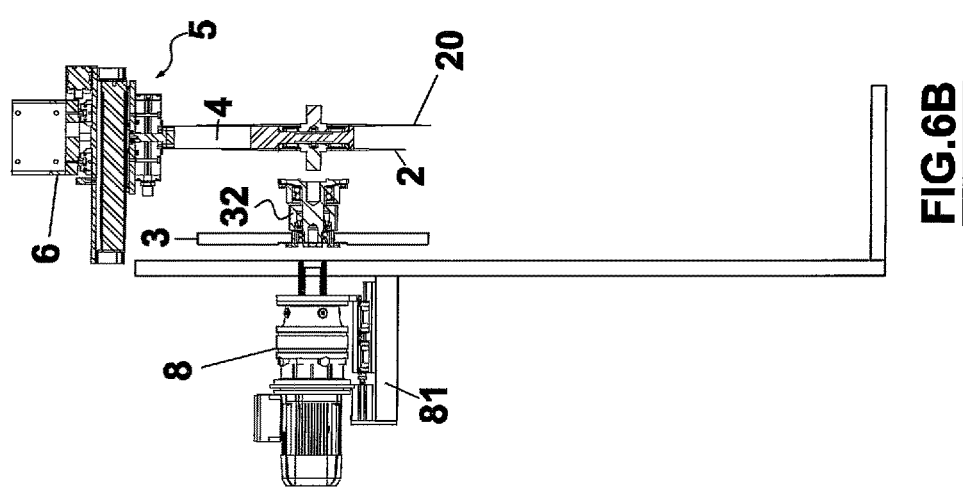
FIG. 6A represents schematic front views of a machine according to the present invention in a succession of operating steps concerning the replacement of a worn blade with a new blade.
FIG. 6B represents, in the same order, schematic side views of the machine of FIG. 6A.
Figures 7A, 7B:
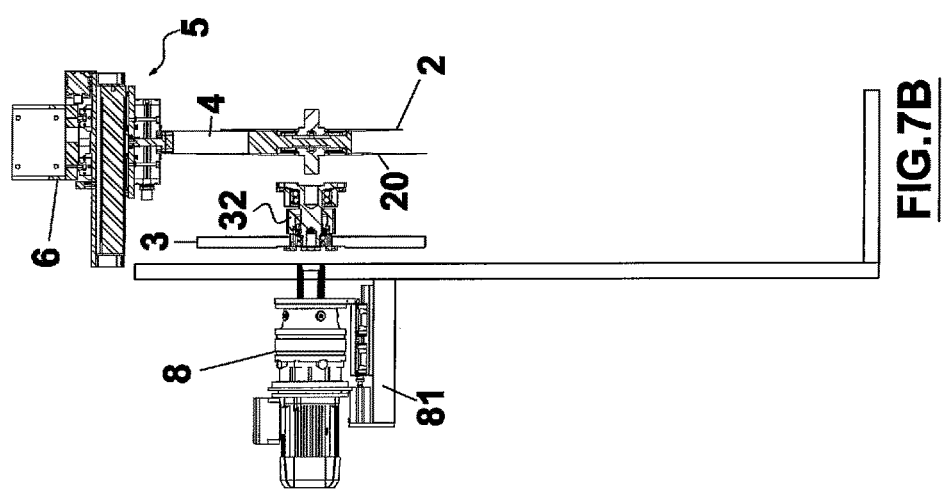
FIG. 7A represents schematic front views of a machine according to the present invention in a succession of operating steps concerning the replacement of a worn blade with a new blade.
FIG. 7B represents, in the same order, schematic side views of the machine of FIG. 7A.
Figures 8A, 8B:
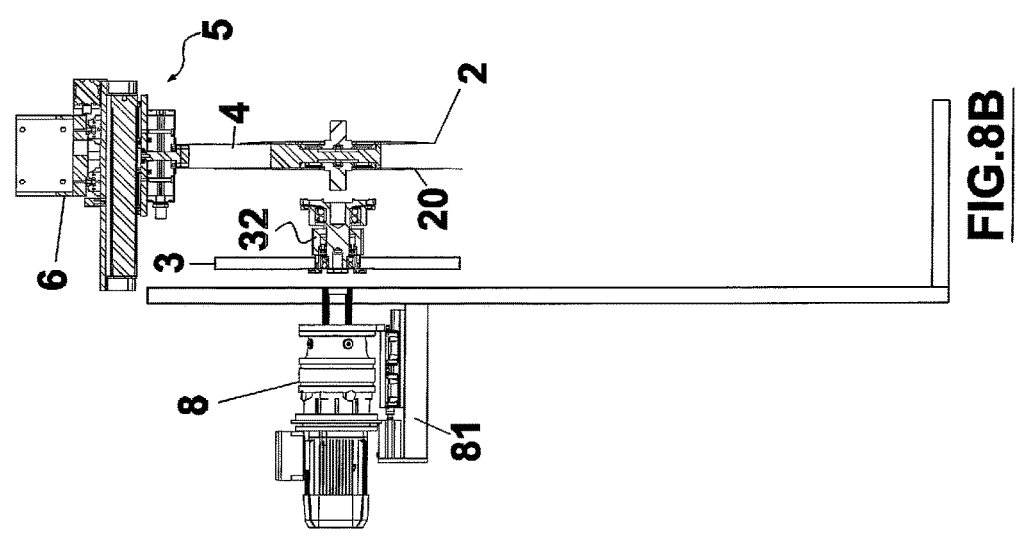
FIG. 8A represents schematic front views of a machine according to the present invention in a succession of operating steps concerning the replacement of a worn blade with a new blade.
FIG. 8B represents, in the same order, schematic side views of the machine of FIG. 8A.
Figures 9A, 9B:
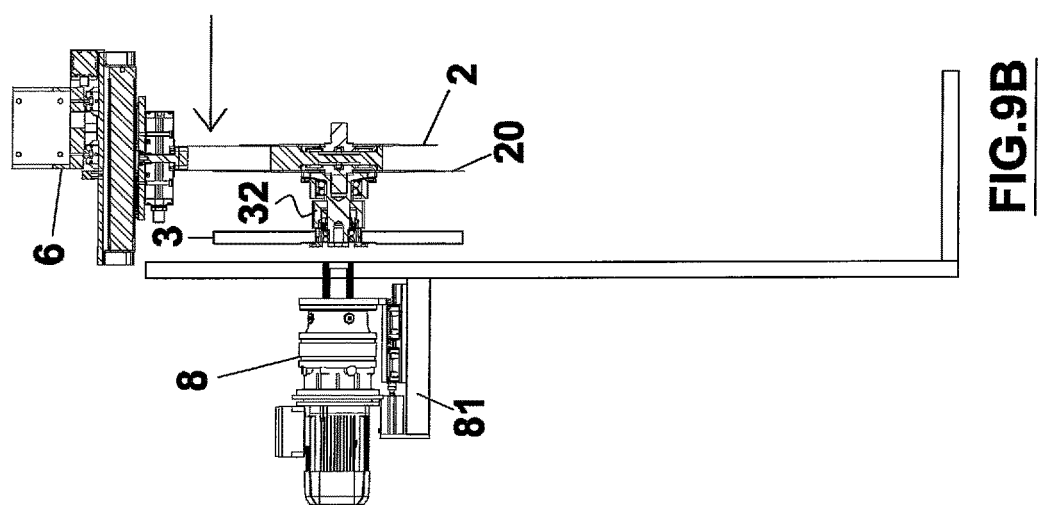
FIG. 9A represents schematic front views of a machine according to the present invention in a succession of operating steps concerning the replacement of a worn blade with a new blade.
FIG. 9B represents, in the same order, schematic side views of the machine of FIG. 9A.
Figures 10A, 10B:
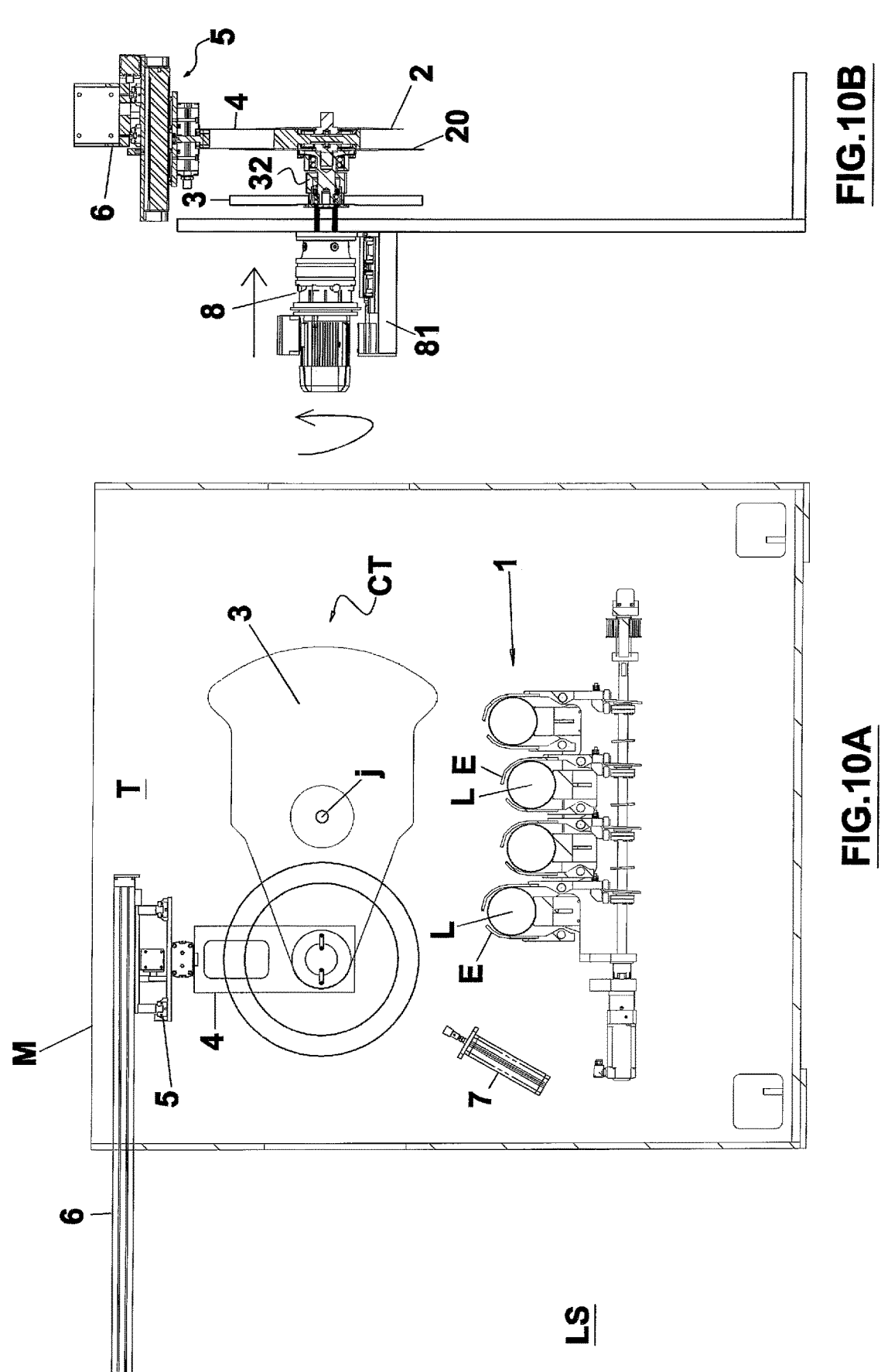
FIG. 10A represents schematic front views of a machine according to the present invention in a succession of operating steps concerning the replacement of a worn blade with a new blade.
FIG. 10B represents, in the same order, schematic side views of the machine of FIG. 10A.
Figures 11A, 11B:
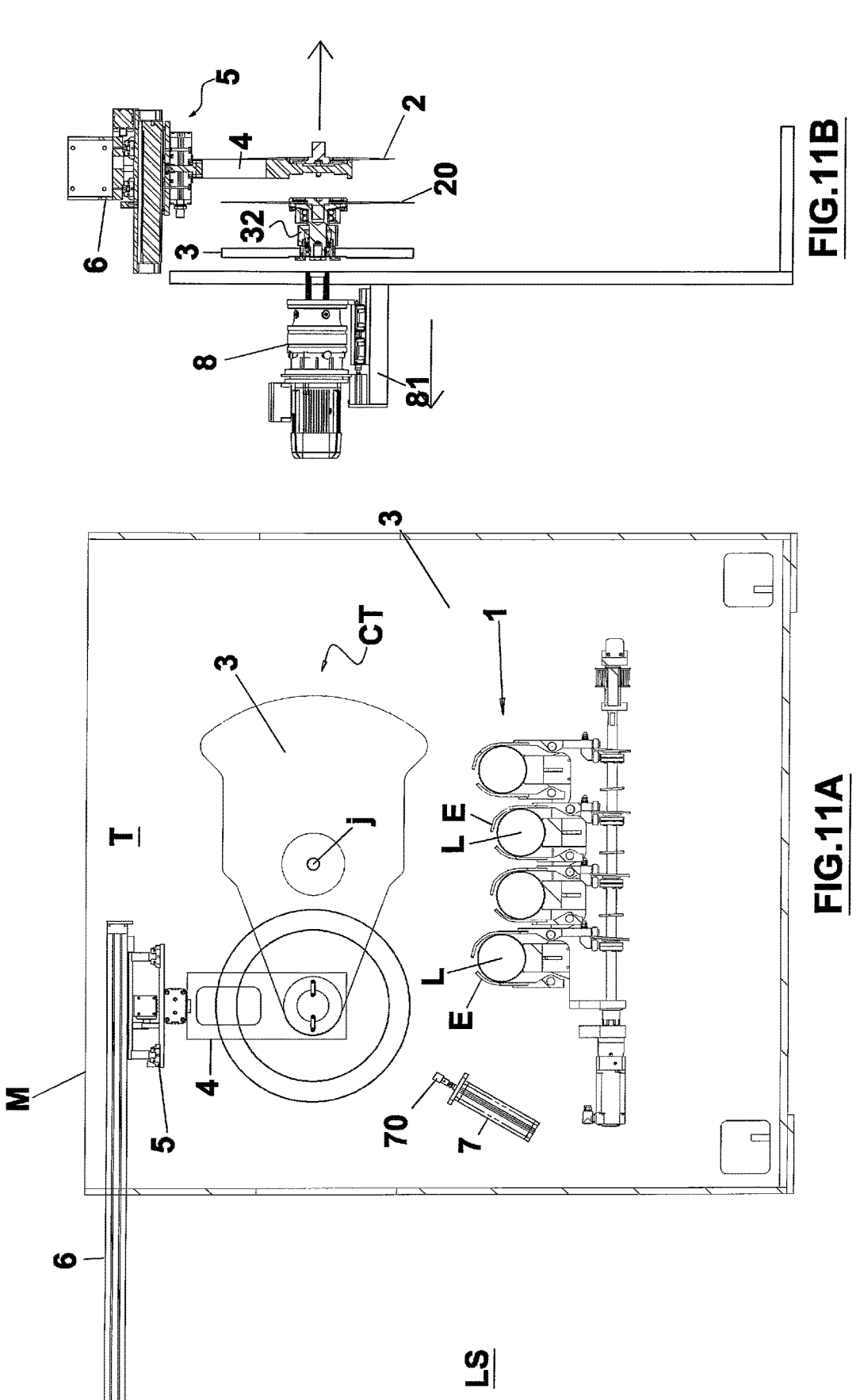
FIG. 11A represents schematic front views of a machine according to the present invention in a succession of operating steps concerning the replacement of a worn blade with a new blade.
FIG. 11B represents, in the same order, schematic side views of the machine of FIG. 11A.

6 new blade 20 has been mounted) facing the operator side of the loading station (LS), i.e. the side of said station where the operator previously mounted the new blade (20). Meanwhile, the blunting device (6, 60) has been deactivated by returning the pad (60) to its initial position spaced from the blade (2) to be replaced as schematically indicated by the arrow "RW" in FIG. 3A. At this point, as shown in FIG. 4A and FIG. 4B, the support (4), with the new blade (20) mounted on it, is brought in front of the arm (3) on which the blade to be replaced (2) is still applied, so that the axis (k) of the pin (461) is coaxial with the axis of the blade (2) to be replaced. Subsequently, the support (4) is moved by the actuator (544) towards the blade (2) so that the hub (46) which holds the latter constrained to the joint (32) fits into the free recess (43) of the support 4 and comes into magnetic contact with the respective magnet (44). While the support (4) is pressed towards the blade (2) by the actuator (544), the gearmotor (8) is moved towards the joint (32), as indicated by the arrow "M4", so that the bushing (80) mates with the central portion of the same joint (32). By operating the gearmotor (8), i.e. by rotating the bush (80), for example clockwise, the hub (46) on which the blade to be replaced is mounted rotates until the keys (45) of the support (4) mesh with the slots (460) of the hub (46). At this point, the unscrewing of the pin (461) of the hub (46) from the joint (32) integral with the arm (3) begins, thanks to the high torque that the gearmotor (8) provides for a predetermined time. Once said predetermined time has elapsed, as shown in FIG. 5A and FIG. 5B, the gearmotor is moved back and the unscrewing is completed by the motor which controls the rotation of the blade (2) by means of the belt (323) to speed up the release operation of the blade from the arm (3). In this way it is possible to use mechanical components of the cutting-off machine also for this operation. When the pin (461) is completely unscrewed from the joint (32), the actuator (544) moves the support (4) away from the arm (3). In this phase, the worn blade (2) remains coupled to the hub (46) which has been removed from the joint (32) and, since the hub (46) is magnetically hooked to the support (4), the worn blade is bound to the support (4) and then removed from the arm (3), as shown in FIG. 6A and FIG. 6B. In a subsequent step, the support (4) is returned to the station (LS), as shown in FIG. 7A and FIG. 7B. Subsequently, the support (4) is rotated again by 180°, as shown in FIG. 8A and FIG. 8B, so as to arrange the new blade (20) as it was previously arranged, i.e. facing the operator side. Then, as shown in FIG. 9A and FIG. 9B, the support (4) is brought in front of the arm (3) until the new blade (20) is positioned in correspondence with the cutting station (T). In a subsequent phase, as shown in FIG. 10A and FIG. 10B, the support (4) is brought closer to the arm (3) so as to bring the pin (461) of the hub (46) of the new blade (20) in a coaxial position with the joint (32) and, while the belt (323) driven by the respective motor determines the rotation of the joint (32), for example counterclockwise, the pin (461) is screwed into the same joint (32) until the blade (20) come into contact with the arm (3); also in this phase. mechanical components of the cutting-off machine are used. This contact condition is detected by the torque limiter circuit of which the motor driving the belt (323) is normally provided. Subsequently, as shown in FIG. 11A and FIG. 11B, the gearmotor (8) is brought back to the operating position, i.e. to the position in which the bushing (80) is inserted in the rear part of the joint (32), to provide the final tightening torque. At the end of this phase, the gearmotor (8) is returned back to the starting position and the actuator (544) controls the removal of the support (4) from the arm (3), such that the new blade (20)

7

Figures 12A, 12B:
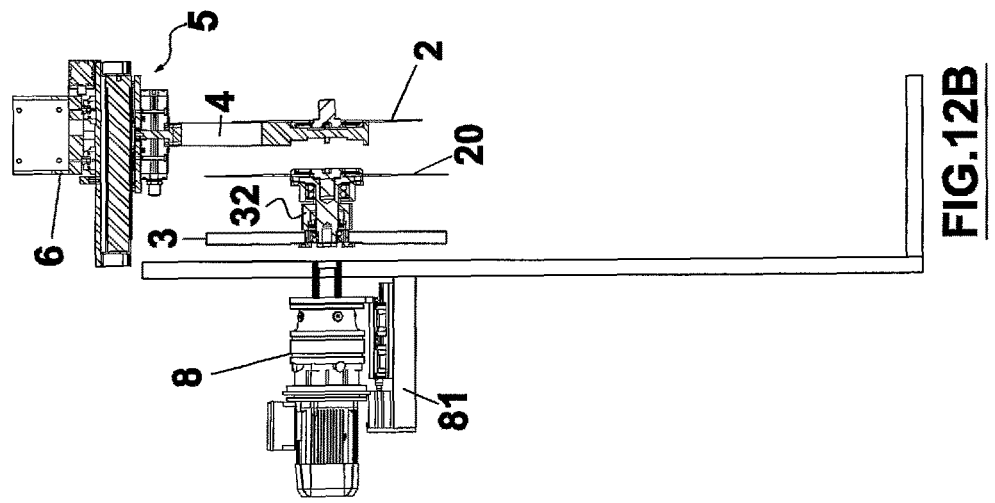
FIG. 12A represents schematic front views of a machine according to the present invention in a succession of operating steps concerning the replacement of a worn blade with a new blade.
FIG. 12B represents, in the same order, schematic side views of the machine of FIG. 12A.
Figures 13A, 13B:
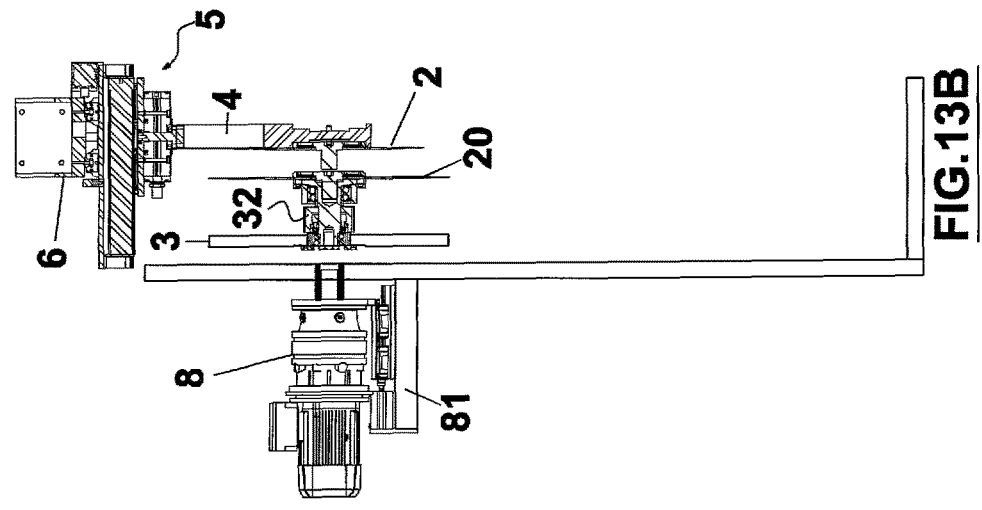
FIG. 13A represents schematic front views of a machine according to the present invention in a succession of operating steps concerning the replacement of a worn blade with a new blade.
FIG. 13B represents, in the same order, schematic side views of the machine of FIG. 13A.
Figure 14B:
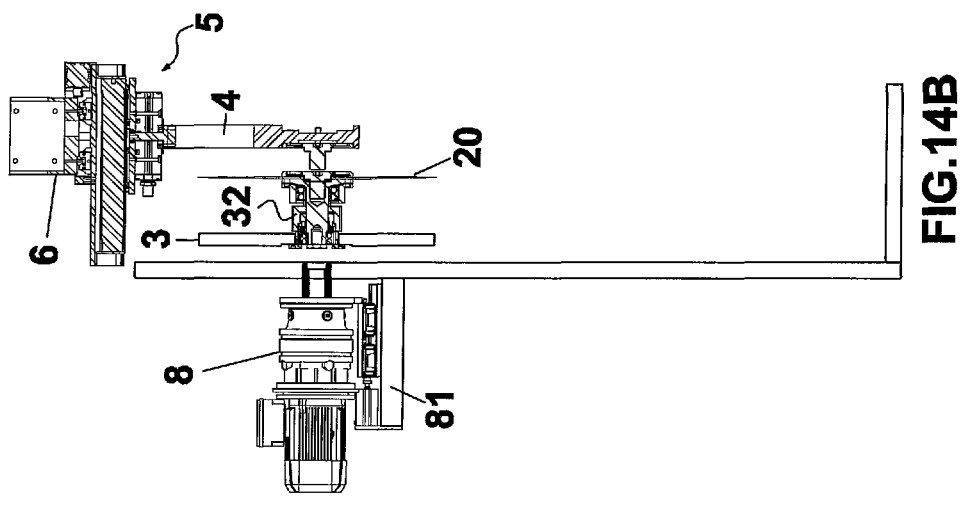
FIG. 14B represents, in the same order, schematic side views of the machine of FIG. 14A.
Figure 14A:
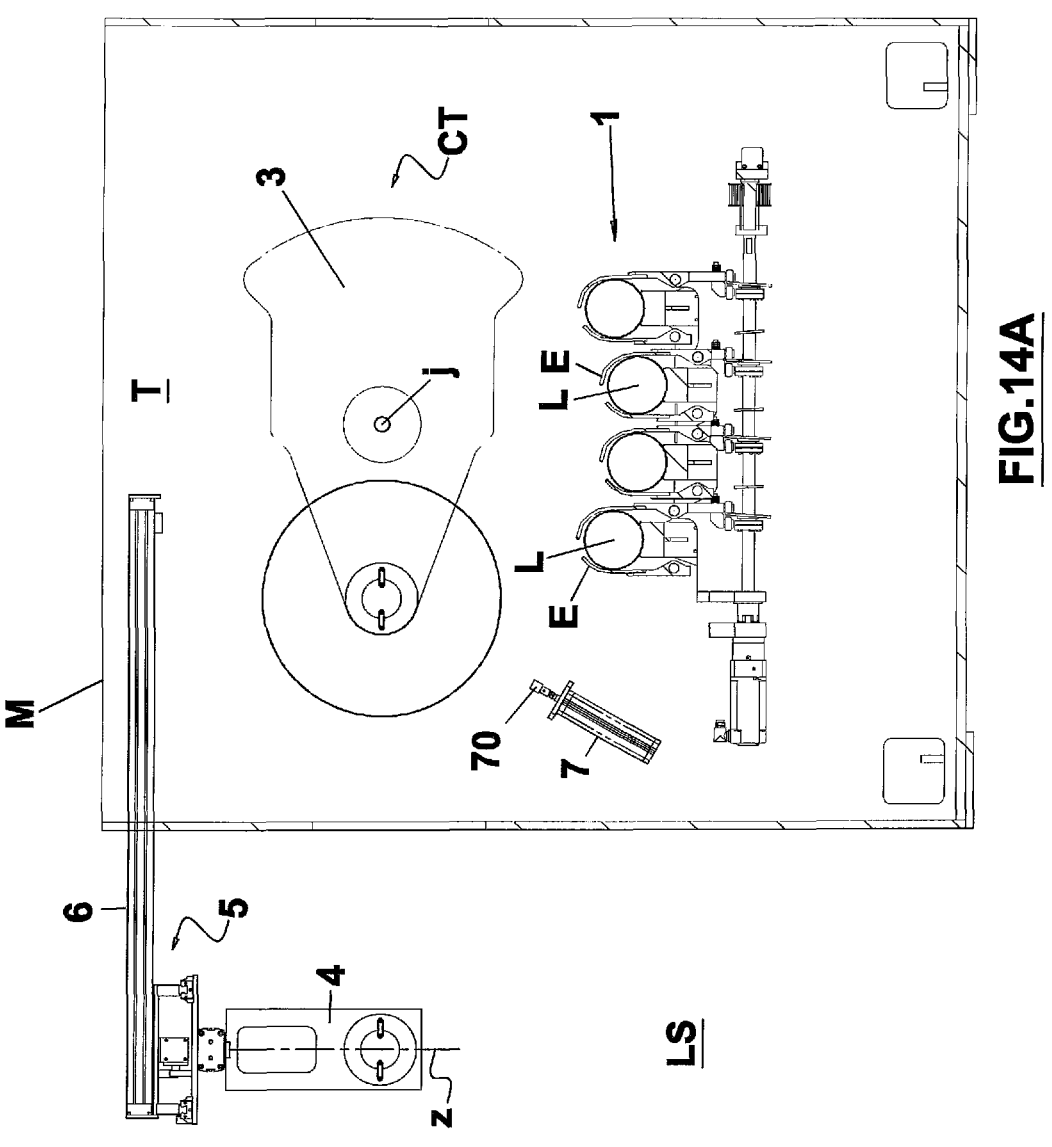
FIG. 14A represents schematic front views of a machine according to the present invention in a succession of operating steps concerning the replacement of a worn blade with a new blade.
Figures 15, 16:
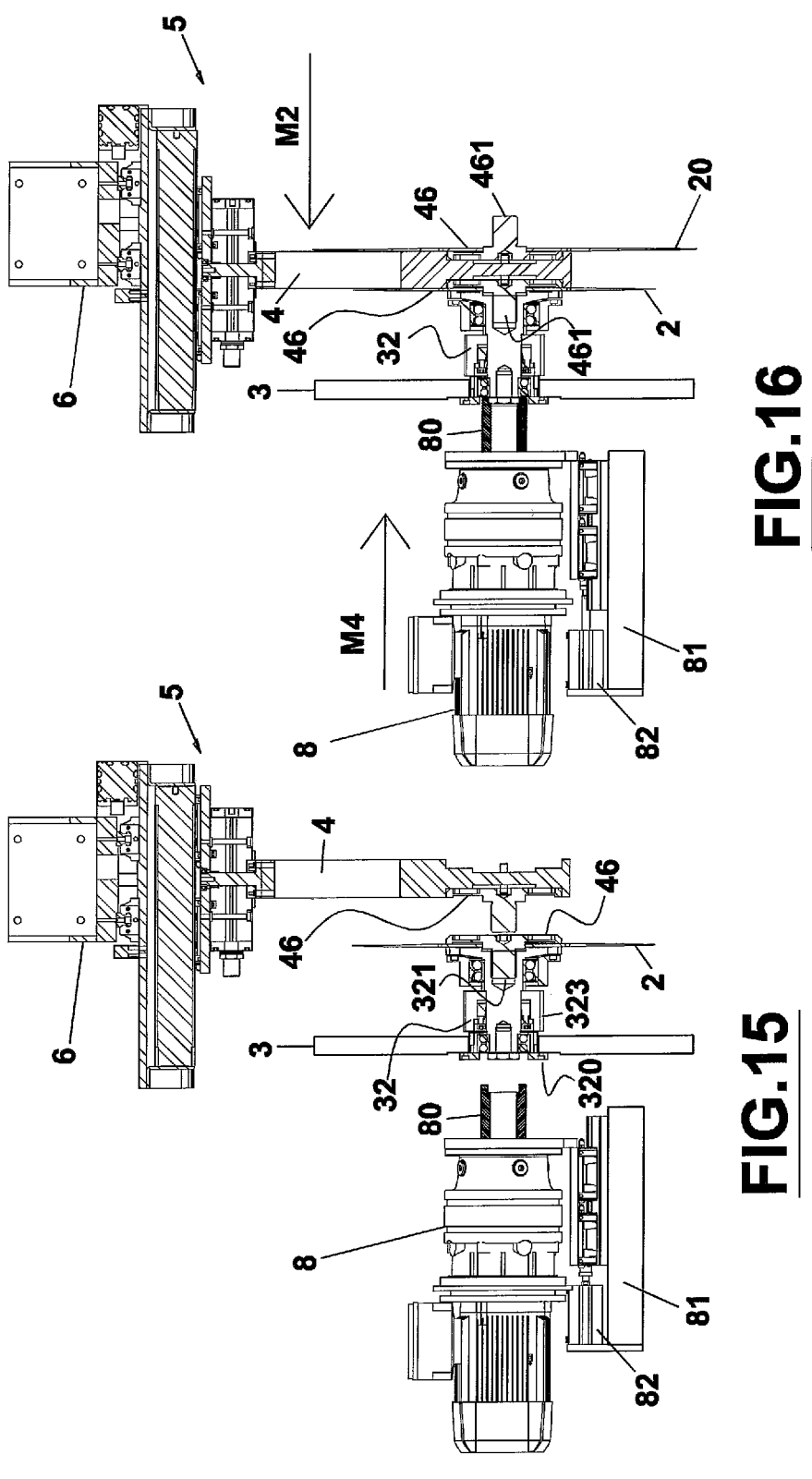
FIG. 15 represents an enlarged detail of FIG. 1A.
FIG. 16 represents an enlarged detail of FIG. 4B.

8 is definitively connected to the latter as shown in FIG. 12A and FIG. 12B. Finally, the carriage (5) is returned to the station (LS), as shown in FIG. 13A and FIG. 13B, the support (4) is rotated 180° around the axis (z), as shown in FIG. 14A and FIG. 14B, and the operator can remove the worn blade (2) from the hub (46) which remains coupled to the support (4) as shown in FIG. 15A and FIG. 15B.

Figure 21:
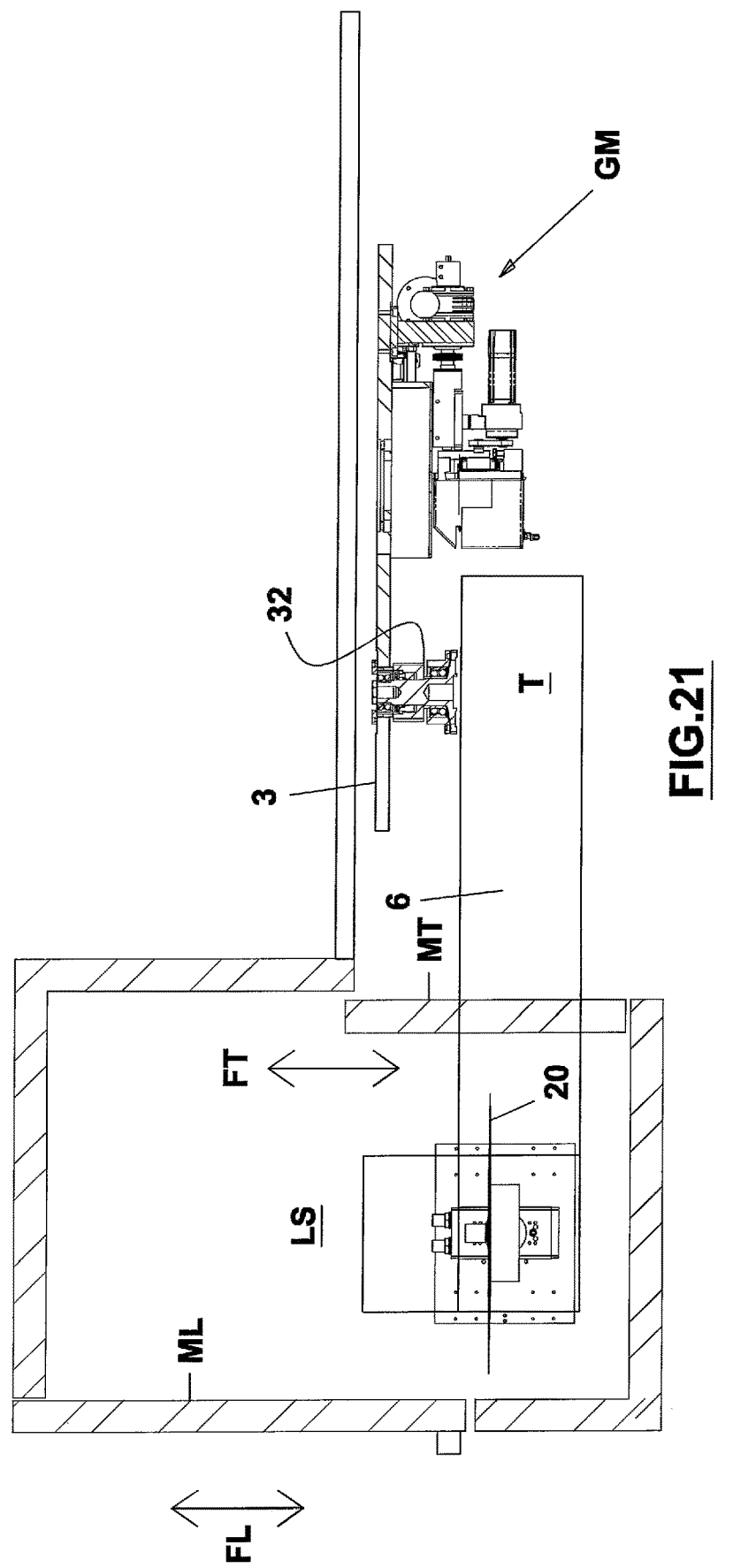
FIG. 21 is a schematic top view of a machine according to the present invention, with parts not shown to better highlight others.

FIG. 21, where the reference "GM" indicates a unit known per se including the actuators that control the rotation of the arm (3) and the blade (2) around their respective axes, is a schematic top view of the blade loading and unloading station (LS) and the cutting station (T). These stations are separated by a movable wall (MT). The station (LS) is accessed through a respective opening controlled by a further mobile wall (ML). The walls (MT, ML) are controlled in such a way that, when the operator is in the station (LS) the wall (MT) is closed. The latter is opened only if the presence of the operator is not detected in the station (LS). When the cutting machine (M) is in operation, both walls (MT, ML) are closed. The opening and closing of the walls (MT, ML) is controlled by a programmable unit according to criteria known per se to industrial automation technicians. The double arrows "FT" and "FL" in FIG. 21 represent the movement of the walls "MT" and "ML" respectively.

In practice, a machine (M) for the transversal cutting of logs of paper material in accordance with the present invention is a machine comprising a cutting station (T) in which a cutting unit (CT) is arranged, comprising an arm (3) rotating around a horizontal axis (j) and on which can be mounted a blade (2) adapted for performing the transversal cut of one or more logs (L) of paper material introduced into the same machine (M) and placed in said cutting station (T), and a loading station (LS) in which a support (4) adapted to support a further blade (20) intended to replace the blade (2) mounted on said arm (3) is arranged.

In accordance with the example described above, a machine (M) according to the present invention comprises a mobile unit formed by a carriage (5), on which said support (4) is mounted, constrained to a guide (6) extending between said cutting station (T) and said loading station (LS), so that the support (4) can be moved bi-directionally between said stations (T, LS) along a path defined by the guide (6).

In accordance with the example described above, the support (4) is bound to the carriage (5) by means of actuators that allow the same support (4) to be moved orthogonally to the guide (6) and around a vertical rotation axis (z).

In the example described above, the support (4) is shaped so that it can simultaneously hold a worn blade (2) and a new blade (20).

Advantageously, the support (4) is always equipped with a hub (46) with a respective pin (461), the hub (46) being removably connected to the support (4). In this way, it is possible to efficiently automate the replacement operations of worn blades. In particular, there is no need to associate each time a hub with the respective pin to the new blades and the removal of the worn blades, as well as the positioning of the new blades replacing the worn ones, are facilitated.

Figure 22:
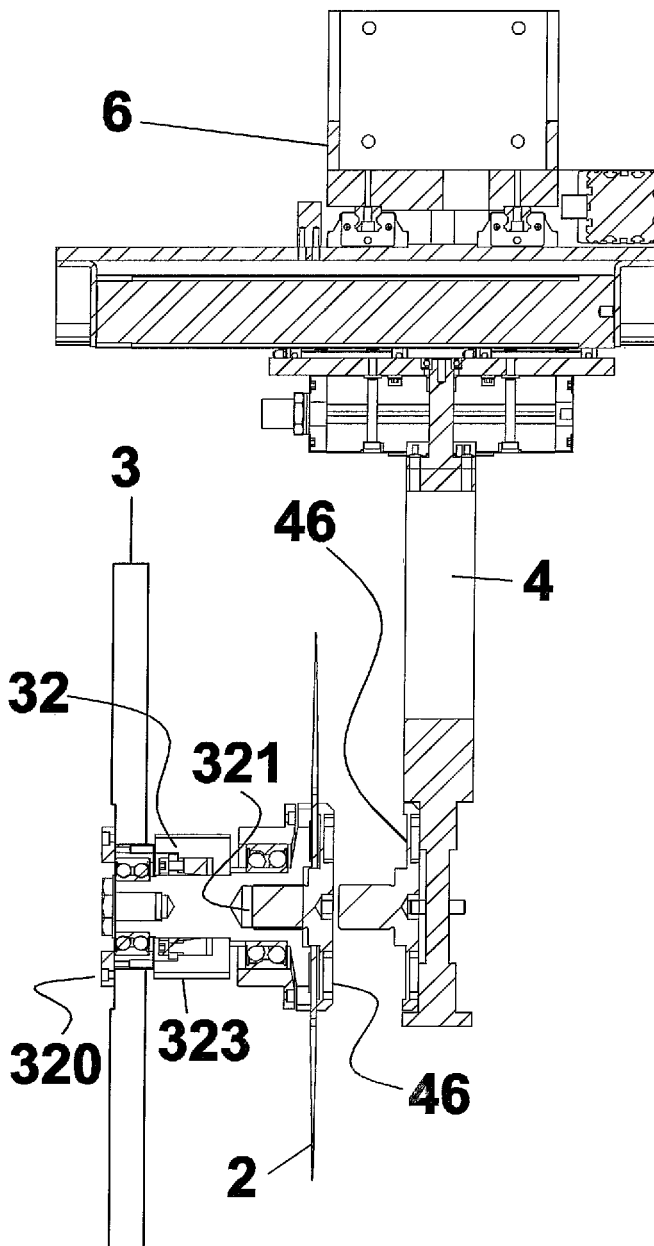
FIG. 22 schematically represents a further embodiment of the present invention.

The use of the gearmotor (8) with the respective bushing (80) is not strictly necessary. FIG. 22 illustrates a configuration similar to that of FIG. 15, in which the gearmotor (8) with the bushing (80) is not provided. In this case, the rotations that in the previous example are determined by the intervention of the gearmotor (8) are instead determined by the motor that drives the blade (2) through the belt (323).

In practice, the details of execution can in any case vary in an equivalent way as regards the individual elements described and illustrated, without departing from the idea of the solution adopted and therefore remaining within the limits of the protection granted by this patent in accordance with the following claims.

The invention claimed is:

1. A machine for transversely cutting logs of paper material, comprising: a cutting station in which is arranged a cutting unit comprising an arm rotating about a horizontal axis and on which arm a blade is mounted to perform the transverse cutting of one or more logs of paper material introduced in the machine, the blade having a blade axis, said arm being placed in said cutting station, wherein the logs of paper material follow respective advancement paths, and the blade and the rotating arm are oriented transversely to the paths followed by the logs of paper material, wherein the horizontal axis around which the arm rotates is parallel to and non-coincident with the blade axis, wherein there is arranged a loading station in which a support is provided for supporting a replacement blade for the blade mounted on said arm, and in which said support is connected to a mobile unit, allowing the support to be moved between said cutting and loading stations while the arm is in the cutting station, wherein the support is provided with a blade-holder hub with a respective pin adapted to engage with the cutting unit, and the blade-holder hub is removably connected to the support, wherein the support is positioned in front of the blade mounted on said arm and is rotatable about a vertical rotation axis located forward of the cutting station, such that the support can be rotated about said vertical rotation axis in front of the blade mounted on said arm.

2. The machine according to claim 1, wherein said support has two opposite faces in each of which a seat is formed for a corresponding blade-holder hub.

3. The machine according to claim 1, wherein the blade-holder hub is magnetically connected to the support.

4. The machine according to claim 1, wherein said mobile unit comprises a carriage movable along a guide which extends between said cutting station and said loading station and said support is constrained to said mobile unit by actuators adapted for moving the same support orthogonally to the guide and for rotating the support around the vertical rotation axis.

5. The machine according to claim 1, wherein said support is adapted to simultaneously support a worn blade and a new blade.

6. The machine according to claim 4, wherein:
the actuators are a set of actuators and the carriage is connected to an actuator of the set of actuators which controls the movement of the carriage along the guide,
the support is constrained to the carriage by a rotary actuator of the set of actuators that controls the rotation of the support around said vertical rotation axis,
the rotary actuator is, in turn, integral with a horizontal plate that slides on guides formed on the carriage,
the carriage has a compartment in which is housed a linear actuator of the set of actuators connected with the horizontal plate, and
the guides and the linear actuator are oriented orthogonally to the guide such that the support can be moved both along the guide, orthogonally to the guide, and in rotation around said vertical rotation axis.

7. The machine according to claim 4, wherein said vertical rotation axis is a central axis of symmetry of the support.

8. The machine according to claim 1, wherein said cutting station and said loading station are separated by a movable wall.

9. The machine according to claim 2, wherein each seat is provided with positioning keys and one side of the blade-holder hub is provided with positioning slots.

10. The machine according to claim 9, wherein said positioning slots are arranged circumferentially around an axis of the blade-holder hub which defines the axis of the respective pin.

\* \* \* \* \*